United States Patent [19]
Matthews, III

[11] Patent Number: 5,815,145
[45] Date of Patent: Sep. 29, 1998

[54] SYSTEM AND METHOD FOR DISPLAYING A PROGRAM GUIDE FOR AN INTERACTIVE TELEVIDEO SYSTEM

[75] Inventor: Joseph H. Matthews, III, Redmond, Wash.

[73] Assignee: Microsoft Corporation, Redmond, Wash.

[21] Appl. No.: 517,255

[22] Filed: Aug. 21, 1995

[51] Int. Cl.⁶ .............................. H04N 7/14; H04N 5/45
[52] U.S. Cl. .................. 345/327; 348/7; 348/12; 348/13; 348/564; 348/906; 455/4.2; 455/5.1
[58] Field of Search ................. 348/906, 6, 10, 348/7, 12, 13, 383, 553, 564, 563, 725, 728, 731; 455/3.1, 4.1, 4.2, 5.1, 6.1, 6.2; 345/326, 327; H04N 7/10, 7/14, 5/445, 5/45

[56] References Cited

U.S. PATENT DOCUMENTS

| | | |
|---|---|---|
| 4,991,012 | 2/1991 | Yoshino . |
| 5,027,400 | 6/1991 | Baji et al. . |
| 5,038,211 | 8/1991 | Hallenbeck . |
| 5,161,019 | 11/1992 | Emanuel . |
| 5,353,121 | 10/1994 | Young et al. . |
| 5,412,720 | 5/1995 | Hoarty . |
| 5,434,625 | 7/1995 | Willis . |
| 5,523,796 | 6/1996 | Marshall et al. . |
| 5,528,304 | 6/1996 | Cherrick et al. . |
| 5,559,550 | 9/1996 | Mankovitz . |
| 5,594,509 | 1/1997 | Florin et al. .............................. 348/731 |
| 5,614,940 | 3/1997 | Cobbley et al. ............................. 348/7 |
| 5,619,249 | 4/1997 | Billock et al. .............................. 348/7 |
| 5,650,826 | 7/1997 | Eitz ......................................... 348/468 |

OTHER PUBLICATIONS

"Designing a Broadband Residential Entertainment Service: A Case Study," Source et al., Sep. 10, 1990, pp. 141–148.

*Primary Examiner*—Andrew I. Faile
*Assistant Examiner*—John W. Miller
*Attorney, Agent, or Firm*—Klarquist Sparkman Campbell Leigh & Whinston, LLP

[57] ABSTRACT

The present invention includes a method of providing programming information to viewers using an interactive television or televideo (IT) system. The programming information includes video display images, and preferably a multi-frame video segment of or relating to the programming on at least one of the selected channels. In a preferred embodiment, the IT system obtains programming images corresponding to programming available on selected channels during a selected programming schedule period. Preferably, at least one of the programming images includes a video segment relating to programming available on one of the selected channels, and the remaining programming images include single frame images relating to the programming available on the remaining ones of the selected channels. The programming images for the selected programming are rendered simultaneously on the video display set of the selected viewer station.

16 Claims, 4 Drawing Sheets

SYSTEM AND METHOD FOR DISPLAYING A PROGRAM GUIDE FOR AN INTERACTIVE TELEVIDEO SYSTEM

FIELD OF THE INVENTION

The present invention relates to interactive television or televideo systems and, in particular, to a method of providing viewers with a video guide to programming available on such systems.

BACKGROUND OF THE INVENTION

Conventional cable and satellite television transmission is evolving into interactive television or televideo (IT) systems. IT systems combine the video broadcast capability characteristic of conventional broadcast television with computer-executed applications or programming responsive to input from viewers. By some estimates, programming available from IT systems under development could include the equivalent of 500 channels of video broadcasting and unlimited numbers of interactive applications.

Meaningful access to large amounts of interactive televideo programming will require that viewers be able to sift through vast amounts of programming and scheduling information. Conventional printed programming guides, such as T.V. Guide (TM) magazine or local newspapers, already provide only incomplete programming information for cable television networks with as few as 50 channels. It is expected that complete printed programming guides for the large amounts of programming in IT systems would be very large and expensive and unacceptably cumbersome.

Some conventional cable television networks dedicate a channel to a programming guide service, such as services provided under the trademarks Prevue Channel, Prevue Express, and Prevue Express Plus by Prevue Networks, Inc. This conventional type of programming service lists the titles of programs scheduled for selected times. Typically, the titles of programs scheduled for about four television channels over a period of about two hours are listed simultaneously. Some non-domestic cable television networks provide similar programming guide services in which video components of several channels are composited into a programming guide by the network operator.

These programming guide services automatically scroll through most or all of the channels available on the cable television network and automatically shift the scheduling period shown according to the actual time. The same program schedule is delivered to all viewers on the cable television network. Viewers passively view the program schedule as it is scrolled.

Conventional cable television program guide services provide only one programming guide for all viewers or subscribers to a network. In an IT system with a wide range of programming, it is expected that individual viewers will prefer selected subsets of the available programming. Under these circumstances, repeatedly requiring viewers to select a subset of programming from a single massive programming guide would be a burden on viewers and a barrier to full utilization of an IT system.

Moreover, conventional programming guide services generally list only very brief text descriptions (e.g., titles) for the programming. While potentially adequate for conventional broadcast systems in which the amount of programming is limited to that carried on up to about 50 channels, such brief text descriptions of programming are expected to provide inadequate program information for the large amounts of programming available on IT systems. Also, the use of text alone to describe the scheduled programming fails to utilize the graphics-based nature of IT systems.

SUMMARY OF THE INVENTION

The present invention includes a method of providing programming information to viewers of an interactive television or televideo (IT) system. The programming information includes video display images, and preferably a multi-frame video segment of or relating to the programming on at least one channel.

The IT system includes a central control node that delivers programming to multiple viewer stations. Each viewer station has a video display set (e.g., a television receiver) and an associated interactive station controller that is responsive to input from the viewer for controlling programming on the video display set. The method of this invention includes providing a video program guide with display imagery relating to scheduled programming including a multi-frame video segment relating to at least some of the scheduled programming.

With reference to a preferred embodiment, the IT system obtains programming images corresponding to programming available on multiple selected channels during a selected programming schedule period. Preferably, at least one of the programming images includes a video segment relating to programming available on one of the selected channels, and the remaining programming images include single frame images relating to the programming available on the remaining ones of the selected channels. The programming images are rendered simultaneously on the video display set of the selected viewer station.

The video program guide of this invention provides display images relating to programming available on the IT system. A viewer can select which channels are displayed and, in a preferred embodiment, control which channels are displayed together. As a result, viewers can conveniently access programming information to facilitate full utilization of the programming available on IT systems.

The foregoing and other features and advantages of preferred embodiments of the present invention will be more readily apparent from the following detailed description, which proceeds with reference to the accompanying drawings.

DETAILED DESCRIPTION OF PREFERRED EMBODIMENTS

Figure 1:
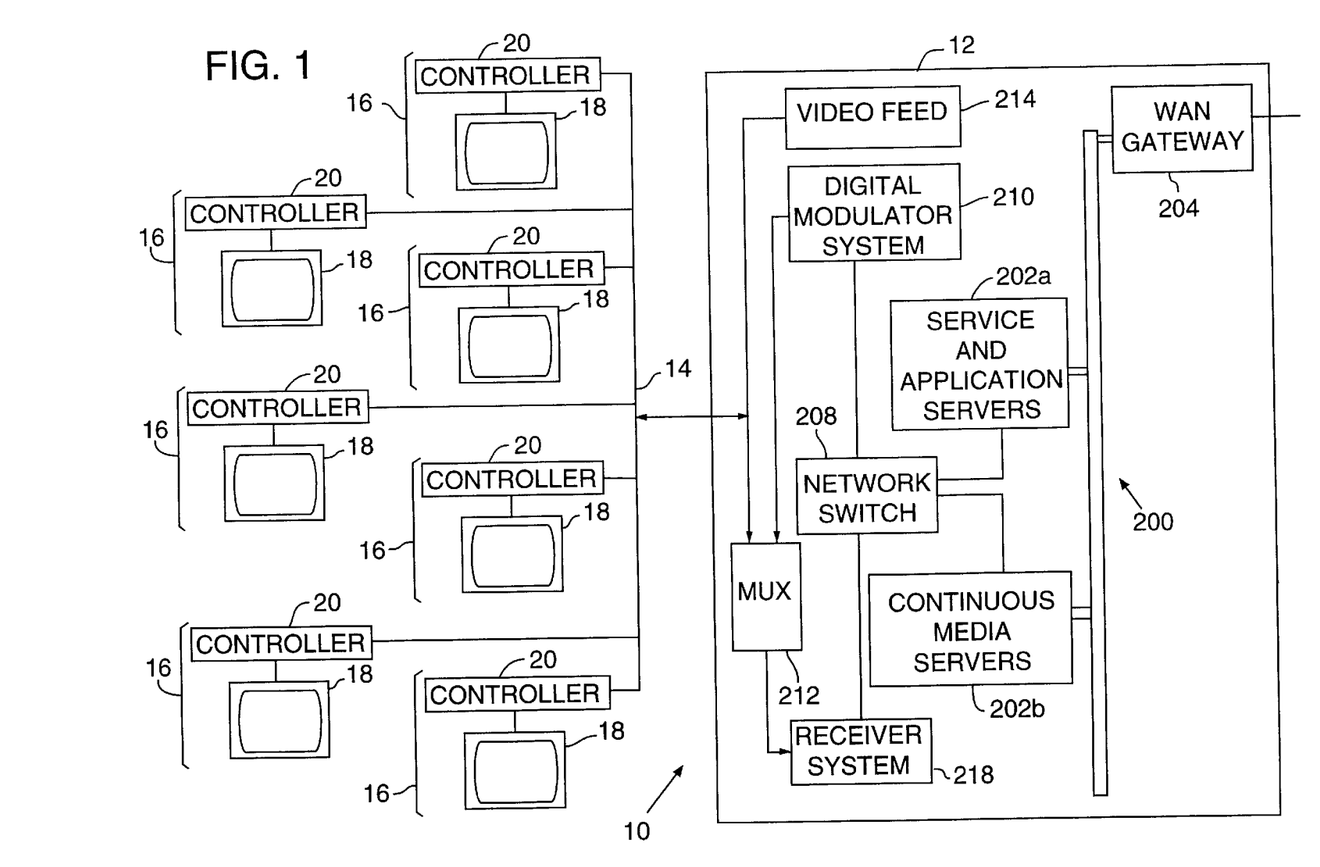
FIG. 1 is a block diagram of an interactive television system used for the preferred embodiment of this invention.
Figure 2:
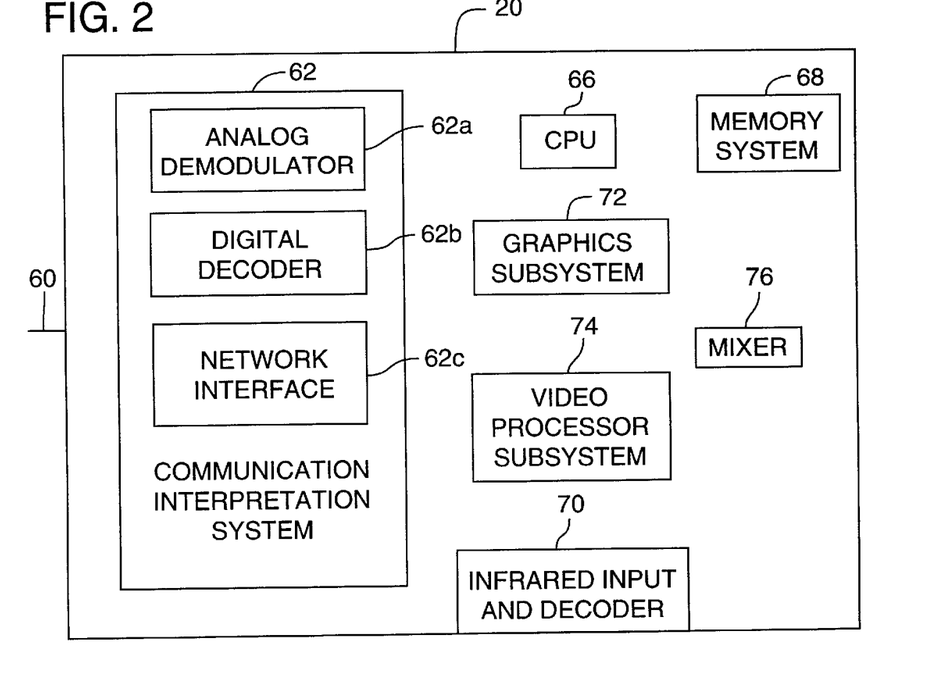
FIG. 2 is a block diagram of an interactive station controller used for the preferred embodiment of this invention.

FIGS. 1 and 2 are directed to an interactive television or televideo (IT) system 10 as an operating environment for preferred embodiments of the present invention. For purposes of simplicity and clarity, IT system 10 is described with reference to widely available systems and standards, including conventional analog television receivers and cable-based video networks.

It will be appreciated, however, that the particular components of IT system 10 may be implemented with a variety of conventions, standards, or technologies without departing from the underlying concepts of the present invention. The term televideo is used to emphasize the applicability of this invention beyond standard television-based systems. As two examples, the conventional analog television receivers and cable-based video network referred to in FIGS. 1 and 2 could be implemented as digital video receivers and a satellite downlink transmission system, respectively.

FIG. 1 is a simplified block diagram of an interactive televideo (IT) system 10 having a central control node 12 that transmits programming over a network 14 to multiple viewer stations (e.g., homes) 16. The programming may include standard analog video broadcasts (e.g., NTSC, PAL or SECAM), digital or digitally encoded video broadcasts (e.g., MPEG1 or MPEG2), or digital information related to computer-executed applications.

Each viewer station 16 includes at least one video display set 18 (e.g., a television receiver) and an interactive station controller 20, which is sometimes referred to as a set-top box. Although it is shown distinct from video display set 18, interactive station controller 20 could alternatively be integral with video display set 18.

Interactive station controllers 20 receive programming from central control node 12 and control the associated video display sets 18 in accordance with the programming. Controlling video display set 18 of a conventional analog type may include, for example, delivering an analog video signal directly to video display set 18 for display, converting a digital video signal to a suitable analog form for display, or executing a computer application that includes displays on display set 18.

Interactive station controllers 20 transmit digital information to and receive digital information from central control node 12. The digital information typically relates to applications executed by processors residing at control node 12 and station controller 20. Preferably, network 14 carries bidirectional communication between station controllers 20 and central control node 12. Alternatively, communication between station controllers 20 and central control node 12 can be carried by different communication systems. For example, programming from central control node 12 to station controllers 20 could be carried on a satellite downlink while station controllers 20 send information to central control node 12 on a terrestrial modem link. An exemplary embodiment of central control node 12 is described in greater detail below.

FIG. 2 is a simplified block diagram of an exemplary one of interactive station controllers 20 for controlling video display set 18 and communicating with central control node 12. Station controller 20 includes an input 60 that delivers communications or information from central control node 12 to a communication interpretation system 62 having, for example, an analog television demodulator 62a, a digital video decoder 62b, and a digital network communication interface 62c.

Demodulator 62a functions as a conventional television tuner for selecting one of multiple conventional analog video signals received from central control node 12 at input 60. Video decoder 62b functions as a digital equivalent of demodulator 62a for selecting one of multiple digital video signals received at input 60 from central control node 12. Network communication interface 62c communicates with central control node 12 with digital information carried over baseband frequencies. The baseband frequencies may be below the conventional analog video signal frequencies, above the digital video signal frequencies, or between the frequencies of analog or digital signals.

A central processing unit (CPU) 66 in conjunction with a memory system 68 controls operation of station controller 20. CPU 66 is responsive to an infrared receiver and decoder system 70 that receives user input from a hand-held viewer control unit 71 (FIG. 3) and delivers the input to CPU 66. For example, CPU 66 controls selection of analog- or digital-based programming or applications delivered from central control node 12, accesses, activates, or executes selected applications, or delivers information to or requests information from central control node 12.

A graphics subsystem 72 is controlled by CPU 66 to form graphics images, including interactive system user interface images, on video display set 18. A video processor subsystem 74, also controlled by CPU 66, provides control in the rendering of video imagery, including decompressing digital video signals and sizing and positioning a video display window.

A mixer 76 receives a video display signal from video processor subsystem 74 and graphics image signals from graphics subsystem 70 and delivers a mixed image signal to video display set 18. Mixer 76 provides compositing, masking and blending of display signals from two or more image sources such as, for example, a digital video signal and locally-generated graphics or an analog video signal and a bitmap image received from central control node 12.

Figure 3:
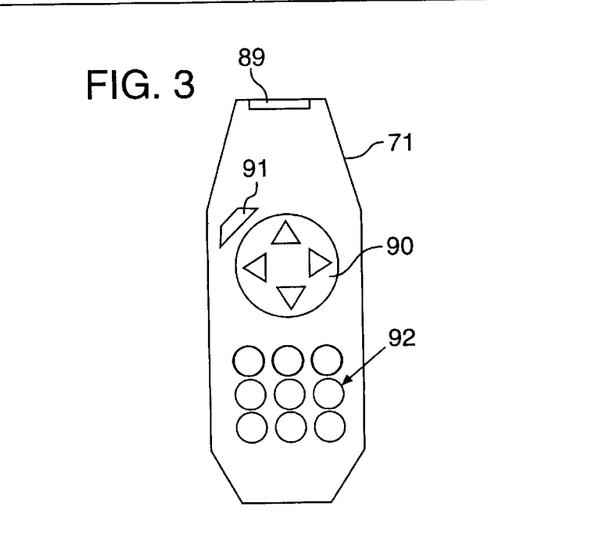
FIG. 3 is a plan diagram of a viewer control unit for providing viewer input to the interactive station controller of FIG. 2.

Referring to FIG. 3, viewer control unit 71 includes an infrared transmitter window 89 through which control unit 71 emits infrared signals to infrared input 70 of station controller 20. A directional control keypad 90 allows a viewer to transmit signals to station controller 20 according to displays it renders on the video display set 18. The viewer may initiate or activate selections by depressing an action key 91 and may enter numeric values with a numeric keypad 92.

Figure 4:
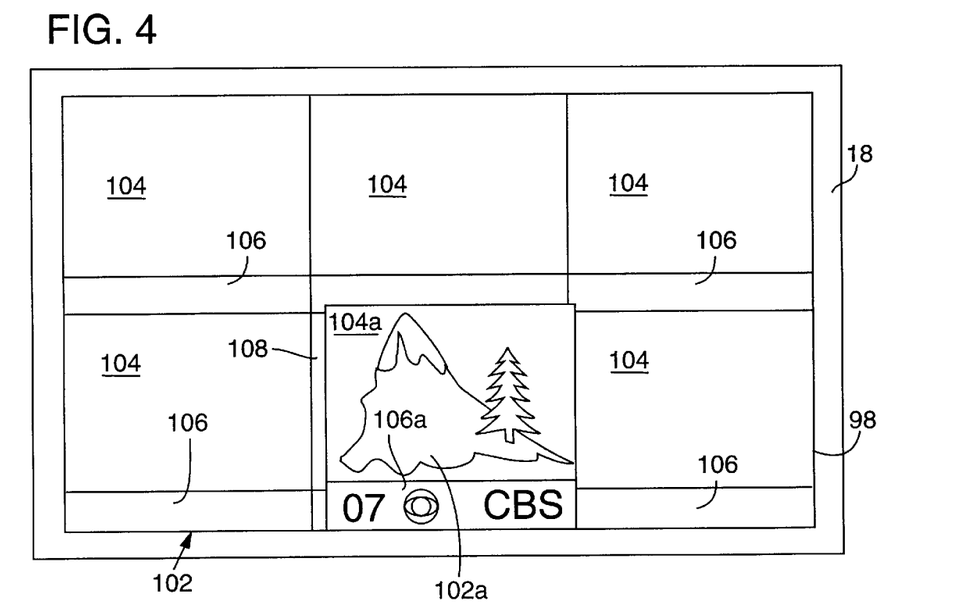
FIG. 4 is a diagram of a video display screen on which a video program guide of the present invention is rendered.

FIG. 4 shows a display screen 98 of one of video display sets 18 with a video program guide 100 of the present invention rendered thereon. Video program guide 100 displays for a viewer multiple video programming tiles 102 corresponding to programming available on selected channels during a programming schedule period. At least one of the video programming tiles 102a includes a multi-frame video segment 104a relating to programming available on a corresponding one of the selected channels. Others of the video programming tiles 102 include single frame images 104 (shown as blanks) relating to programming available on other ones of the selected channels.

Each video programming tile 102 includes a channel identification panel 106 for identifying the corresponding channel. Each channel identification panel 106 preferably includes a channel number, a channel logo or icon, and a name corresponding to the programming or programming provider.

A viewer navigates between or selects video programming tiles 102 of video program guide 100 primarily with directional control keypad 90. Interactive station controller 20 is responsive to viewer manipulation of directional control keypad 90 and the resulting control signals generated by viewer control unit 71 to move a cursor 108 (i.e., an indication of position) between video programming tiles 102. Alternatively, a viewer can navigate between or select video programming tiles 102 according to numeric values corresponding to channels entered by the viewer with numeric keypad 92.

The cursor 108 may be rendered on display screen 98 as a graphic character or icon or by changing the graphic characteristics of the video programming tiles 102 where the cursor is positioned. For example, the video programming tile 102 may be offset slightly from its conventional position and a border rendered around it so the tile appears to be raised from its conventional position. The programming identified in a video programming tile 102 to which a viewer moves the cursor 108 is referred to as being focused upon by the viewer or as focused programming.

The video programming tile 102 focused upon by a viewer is referred to herein as the focused video programming tile 102a for which a multi-frame video segment 104a is rendered, if available. The accessing of the multi-frame video segment 104a is performed automatically by interactive station controller 20 according to the location of the focus cursor.

For example, if the programming corresponding to the focused video programming tile 102a is currently available to the viewer station 16 (e.g., conventional broadcast television), interactive station controller 20 tunes to the programming and renders it within video programming tile 102a. If the programming corresponding to the focused video programming tile 102a is not currently available to the viewer station 16 (e.g., pay-per-view programming to which the viewer has not subscribed), interactive station controller 20 accesses a digitized video segment relating to the programming from central control node 12 for rendering within video programming tile 102a or tunes to the programming only for a predetermined period (e.g., one minute).

The video programming tiles 102 other than the focused video programming tile 102a render still images of programming on the corresponding channels. The still images may be single frames of the programming obtained by tuning to the programming and acquiring an image frame of the programming. The acquisition of image frames in this manner can be performed by the components of interactive station controller 20 on a real-time basis. Alternatively, still images of this type can be acquired and stored, either a interactive station controller 20 or at central control node 12.

Figure 5:
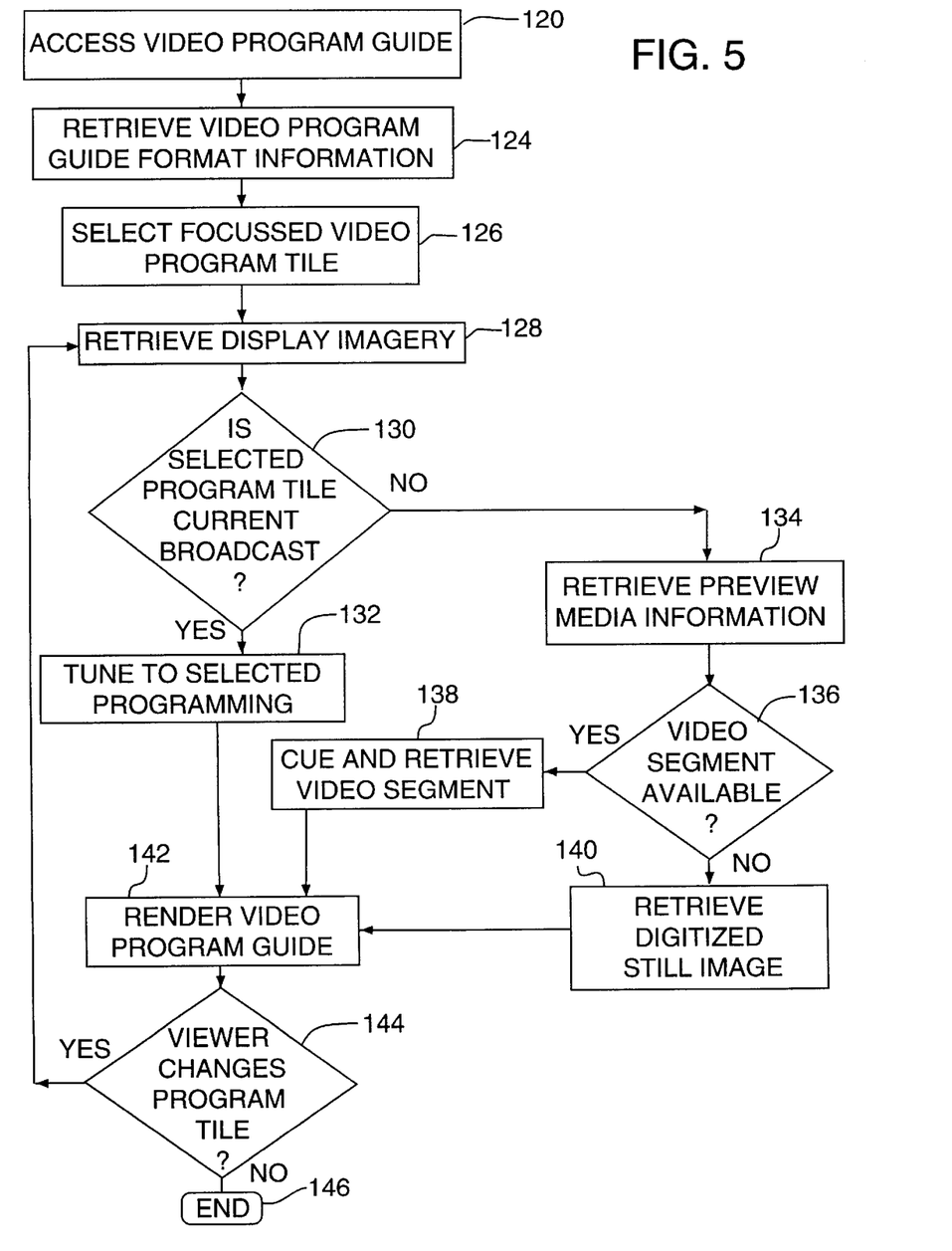
FIG. 5 is a flow diagram of a method of providing a video program guide according to the present invention.

FIG. 5 is a flow diagram showing a method of providing a video program guide for programming available on IT system 10. For simplicity, the method is described with reference to a selected viewer station 20 and a selected video display set 18.

Process block 120 indicates that a viewer at selected viewer station 20 requests or accesses the video program guide 100. The video program guide 100 may be assigned a channel number like any other programming on IT system 10 and accessed, for example, by the viewer keying the channel number on numeric key pad 92 or scrolling to the channel. The video program guide 100 may be one of several alternative program guides available on IT system 10, either on separate channels or as selections from a system menu accessed on a program guide channel.

Process block 124 indicates that video program guide format information is retrieved by CPU 66 from memory system 68. The format information includes, for example, an array format indicating the number and arrangement of video programming tiles 102 in video program guide 100, a channel assignment listing that maps channels available on IT system 10 to particular video programming tiles 102, channel video access information pointing to sources of multi-frame and single frame video segments for channels, and text and graphic information corresponding to the channels for rendering within channel identification panels 106. As described below in greater detail, the video program guide format information preferably is definable by the viewer to provide a viewer-specified arrangement of channels in video program tiles 102 for each viewer station 16.

Process block 126 indicates that focused video program tile 102a is selected from the multiple video programming tiles 102. Initially, upon accessing video program guide 100, focused video program tile 102a is selected as the channel on IT system 10 most recently viewed on the selected video display set 18 before video program guide 100 was requested. Subsequently, focused video program tile 102a may be selected by a viewer in the manner described above.

Process block 128 indicates that interactive station controller 20 begins retrieving display imagery for incorporation in video program guide 100 on video display set 18.

Decision block 130 represents an inquiry as to whether the programming of focused video program tile 102a is currently being broadcast and available to the user. Availability of the selected programming relates, for example, to whether the viewer is a subscriber to the selected programming. Decision block 130 proceeds to process block 132 whenever the selected program is currently being broadcast and available to the user and otherwise proceeds to process block 134.

Process block 132 indicates that communication system 62 tunes to the selected programming for display on video display set 18 within focused video program tile 102a of video program guide 100.

Process block 134 indicates that central control node 12 retrieves preview media information from an electronic program guide (EPG) database within central control node 12 or, alternatively, from memory 68 of station controller 20. The preview media information indicates whether the preview or display imagery available for the selected programming of focused video program tile 102a includes a multi-frame video clip or segment of or relating to the selected program or a still image of or relating to the selected programming.

Decision block 136 represents an inquiry as to whether a digitized preview video clip or segment is available for the selected programming. Decision block 136 proceeds to process block 138 whenever a digitized video clip or segment is available and otherwise proceeds to process block 140.

Process block 138 indicates that the digitized video clip or segment is cued from an electronic programming guide (EPG) preview server computer at central control mode 12 and transmitted to interactive station controller 20 for display to the viewer.

Preferably, the digitized video segment relates to the specific episode of the selected programming. If an episode-specific segment is not available, the digitized video segment preferably relates to any program series of which the selected programming episode is a part. If a series-specific segment is not available, the digitized video segment preferably relates to the channel carrying or broadcasting the selected programming.

Process block 140 indicates that a digitized still image is retrieved from the EPG database and transmitted to interactive station controller 20 for display to the viewer. Preferably, the still image relates to the specific episode of the selected programming. If an episode-specific still image is not available, the digitized still image preferably relates to any program series of which the selected programming episode is a part. If a series-specific still image is not available, the digitized still image preferably relates to the channel carrying or broadcasting the selected programming.

Process block 142 indicates that video program guide 100 of the type shown in FIG. 4 is rendered by selected video display set 18 on its display screen 98. Preferably, video program guide 100 is rendered by cooperation between central processing unit 66, graphics subsystem 72, and video processor subsystem 74, which functions to size and position the display imagery within each of the video programming tiles 102.

Decision block 144 represents an inquiry as to whether the viewer has selected or focused on a different video program tile 102. Decision block 144 returns to process block 126 if the viewer has selected or focused an a different video program tile 102 and otherwise proceeds to end block 146.

A digitized audio segment may be retrieved from the EPG database for playing with each digital video segment or still image. The audio segment may include one or more of a voice announcement, an audio portion of the selected programming, or music. The accessing and retrieval of audio segments would be substantially the same as the accessing and retrieval of still images or digitized video segments.

Preferably, the audio segment relates to the specific episode of the selected programming. If an episode-specific segment is not available, the digitized audio segment preferably relates to any program series of which the selected programming episode is a part. If a series-specific segment is not available, the digitized audio segment preferably relates to the channel carrying or broadcasting the selected programming.

The method described above is directed to an IT system 10 in which selected information is stored at and retrieved from the EPG database or server at central control node 12. The benefits of the present invention could also be achieved in IT systems having some or all of the selected information stored at and retrieved from interactive station controllers.

The availability of display imagery for use in video program guide 100 is based upon the electronic programming guide (EPG) database, which is managed within central control node 12, as described below in greater detail. The EPG database preferably includes the following tables:

i) an episode table containing records for each interactive or broadcast televideo episode;

ii) a series table containing records for each interactive or broadcast series;

iii) a still image table comprising bitmaps or vector graphic definitions of still-image previews or pointers to computer files containing such still-image previews;

iv) an audio table containing digitized audio digital wave synthesis definitions or MIDI (Musical Instrument Digital Interface) note and timing definitions of music and voice-over previews or pointers to computer files containing such audio previews;

v) an audio/video table containing digitized video and audio, either in MPEG, AVI, Quicktime or other digital video format for full-motion video and audio storage, or pointers to computer files containing such video previews;

vi) a tuning information table containing broadcast, cable-cast or satellite transmission tuning information for channel lineups available to viewers, including network and affiliation information; and vii) a programming characteristic table containing broadcast properties or characteristics such as closed captioning and viewer discretion advised, which include pointers to image definitions of associated descriptive icons.

Within the EPG database, each programming event or episode record is linked to a parent series record. One-time programming events or specials have a single episode record linked to a single series record. Each episode record can have pointers to episode preview or display imagery in still image, audio, or multi-frame digital video format. Each episode may also be linked to selected broadcast properties that identify selected characteristics of the episode.

Similarly, each series record may have pointers to previews or display imagery relating to the series in still image, audio, or multi-frame digital video format, or selected broadcast properties that identify selected characteristics of the series. Also, each channel record may have pointers to previews or display imagery relating to the channel in still image, audio, or multi-frame digital video format, or selected broadcast properties that identify selected characteristics of the channel. The term channel refers to a provider of programming and can include, for example, a broadcast network or an application provider.

Retrieval of text description, information icons, and preview display imagery entails correlating the programming selected or focused upon by the viewer with the corresponding episode record. Any pointers in the record to program summary information are tracked and the information is retrieved. If no pointers to program summary information are associated with the episode, the programming selected by the viewer is correlated with the corresponding series record in the series table. Any pointers to series-specific program summary information are tracked and the information is retrieved.

If the series record contains no pointers to program summary information, a default still image or graphic retrieved for rendering within preview window 94. The default still image may be a channel-specific image or graphic for the channel carrying or transmitting the selected programming or a predetermined IT system or EPG image or graphic.

Table 1 below lists the preferred display imagery rendered in focused video program tile 102a of video program guide 100 for different types of programming on IT system 10. The display imagery in focused video program tile 102a preferably is the currently broadcasting programming for focused programming available to the viewer. Programming available to the viewer includes the programming to which the viewer subscribes, including premium programming services.

TABLE 1

| Type of Service/ Channel Selected | Broadcast Preview | Continuous Media Server Preview | Still Preview |
| --- | --- | --- | --- |
| Audio on demand | NO | If bandwidth available | YES |
| Current or future PPV broadcast | If limited in some way (for example timed preview, disabled audio or alternate | If bandwidth available | Likely |

TABLE 1-continued

| Type of Service/ Channel Selected | Broadcast Preview | Continuous Media Server Preview | Still Preview |
|---|---|---|---|
| | audio track) | | |
| Current broadcast (not PPV) | Always | NO | NO |
| Electronic Program Guide | NO | NO | YES |
| Future broadcast (not PPV) | NO | First choice if bandwidth available | Second choice |
| Interactive service | NO | First choice if bandwidth available | Second choice |
| Past broadcast (PPV/Continuous Media Server archive) | NO | First choice if bandwidth available | Second choice |
| NVOD service | First choice - asynchronous loop | NO | Second choice - still carousel |
| VOD service | NO | First choice if bandwidth available | Second choice |

Rendering the selected programming in focused video program tile 102a could also be used in connection with current or future pay-per-view (PPV) broadcasts, if the preview were limited until the viewer elects or subscribes to the broadcast. An asynchronous loop of broadcast previews could be rendered in preview display window 94 for near-video-on-demand (NVOD) services.

An asynchronous loop of broadcast previews could include non-specific video segments or trailers, or service advertisements, delivered simultaneously to all viewers and thus requiring no media server load or dedicated media server channels. A broadcast preview could be implemented for each of the other listed services with an asynchronous loop of broadcast previews carried on a dedicated channel.

Video clips or segments of multiple frames would preferably be rendered in focused video program tile 102a for future non-PPV broadcasts, interactive services such as news-on-demand or an interactive game service, past broadcast services, video-on-demand (VOD) services, and if, bandwidth is available on network 14, audio-on-demand and current or future PPV broadcasts. In connection with all types of service, still images could be rendered in focused video program tile 102a as a system backup or due to limited system capability.

Video program guide 100 is described herein above as including only one video program tile 102a with a multi-frame video segment 104a. This implementation reflects the preferred configuration of video display set 18 as a conventional television receiver. Such receivers typically include only one tuner and are therefore capable of tuning to only one channel at any time. It will be appreciated that the present invention could alternatively be implemented to provide multiple or all video program tiles 102 with multi-frame video segments 104a to the extent video display set 18 and station controller 20 are capable of simultaneously tuning to and rendering multiple IT system channels.

Figure 6:
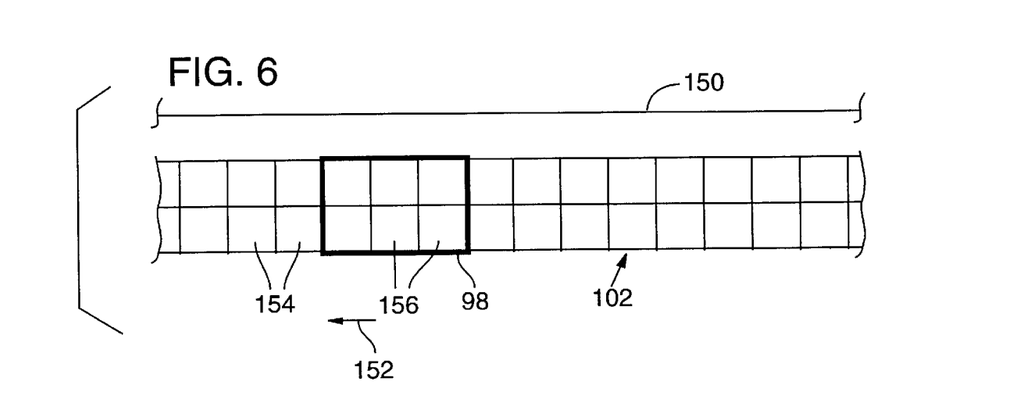
FIG. 6 is a schematic representation of a video programming guide space of video programming tiles relative to an exemplary video display screen window.

FIGS. 6 is a schematic representation of a video programming guide space 150 of video programming tiles 102 relative to an exemplary video display screen 98. Each of the video programming tiles 102 corresponds to one of the channels available from IT system 10. Video programming tiles 102 corresponding only to a few (e.g., six) of the potentially hundreds of tiles 102 in video programming guide space 150 can be rendered simultaneously on the video display screen 98. Accordingly, the video display screen 98 is represented as a window into a portion of programming guide space 150. It will be appreciated that video programming guide space 150 is a schematic representation of the relationship between video display screen 98 and video programming tiles 102 and does not literally correspond to the representation of video programming tiles 102 within memory 68.

A viewer can scroll through the video programming guide space 150 by the same manipulation of directional control keypad 90 on viewer control unit 71 used to move the cursor between video programming tiles rendered on video display screen 98. For examples a viewer can move the cursor in a leftward direction 152 while the focused video programming tile 102a is a left-most one of the video programming tiles the video display screen 98. The leftward translation of the cursor will cause the window corresponding to video display screen 98 to shift leftward in the programming guide space, as shown in FIG. 6B. As a result, video programming tiles 154 previously outside the window of video display screen 98 are included therein, and video programming tiles 116 previously within the window of video display screen 98 are omitted therefrom.

In a default implementation, the arrangement of channels in video program tiles 102 of video programming guide space 150 is based upon channel number. Channel numbers increase within video programming guide space 150 from top-to-bottom and from left-to-right. This arrangement of channels is maintained in a channel assignment listing stored in memory system 68 and discussed with reference to process block 124 in FIG. 5.

As another aspect of this invention, a viewer at selected viewer station 20 can vary the arrangement of channels in video programming guide space 150 from the default numerical sequence. For example, within a program guide control mode, the viewer may group together the channels most frequently accessed. Such channel arrangement changes are performed by modifying the channel assignment listing with CPU 66 and storing the modified channel arrangement listing in memory system 68. The viewer could input changes to the channel arrangement either through a graphical interface in which the viewer re-positions video program titles 102 with control unit 71 or by channel number entries on numeric keypad 92 of control unit 71.

Similarly, a viewer can vary the arrangement of video program tiles 102 in video programming guide space 150 and on display screen 98. As shown in FIGS. 4 and 6, display screen 98 of video display set 18 renders six video program tiles 102 that are arranged in two rows within video programming guide space 150. In accordance with the size and resolution of video display set 18, the viewer could modify video programming guide space 150 to include different numbers of rows (e.g., 1, 3, or 4) or video program tiles 102. Similarly, the viewer could arrange video programming guide space 150 to have a vertical orientation so that scrolling occurred vertically rather than horizontally. Changes in the arrangements of video program tiles 102 in video programming guide space 150 or on display screen 98 can be implemented by modifying the array format information or parameters stored in memory system 68 and discussed with reference to process block 124 in FIG. 5.

Referring to FIG. 1 central control node 12 includes a digital local area network (LAN) 200 with multiple computer servers 202 for performing various interactive system applications or functions referred to above. Servers 202 include, for example, multiple state-of-the art microprocessors that operate in parallel and access or control data storage devices with large data capacities. A digital communication gateway 204 couples LAN 200 to a wide area network (WAN) (not shown) for obtaining and delivering IT system information.

Servers 202 may include, for example, service and application servers 202*a* and continuous media servers 202*b*. Service and application servers 202*a* process interactive service requests from subscribers and provide services and applications associated with operation of IT system 10. Service and application servers 202*a* may be dedicated to particular applications such as message transmission, an electronic programming guide for viewers, network security, monitoring, object storage, financial transactions, data access, and other administration functions. An operator at central control node 12 can control message content and recipients through a terminal or console associated with the applicable server 202*a*, including selectively accessing audio or video components (e.g., from a server 202*b*).

Continuous media servers 202*b* provide storage and on-demand or near on-demand delivery of digitized video information. The digitized video information can include video programming of substantially any duration ranging from individual image frames and brief video clips to full-length motion pictures.

Servers 202 communicate with station controllers 12 via a network communication switch 208, such as an asynchronous transfer mode (ATM) switch. For communication from servers 202 to station controllers 20, network communication switch 208 arranges digital information received from servers 202 in a standard bidirectional digital communication format for transmission over network 14. For communication from station controllers 12 to servers 202, network communication switch 208 converts digital information from the standard bidirectional digital communication format for delivery to servers 202.

Digital information from servers 202 is frequency modulated by a digital modulator system 210 for transmission over network 14. Digital information that includes video programming is preferably modulated at frequencies greater than the standard analog television frequency range, which is 50–450 MHz under the NTSC television standard. Digital information that does not include video programming may be modulated at baseband frequencies that are less than the standard analog television frequency range, greater than the standard analog television frequency range, or between television signal frequencies.

A multiplexing system 212 receives and mixes the frequency modulated digital information from modulator system 210 and standard analog video signals obtained from a standard analog video feed 214 and delivers an IT composite signal to interactive network 14. Analog video feed may be or include a satellite downlink, a cable receiver, or any locally generated programming. A reverse channel receiver system 218 receives and demodulates digital communications from station controller 20 for processing by servers 202.

Having illustrated and described the principles of the present invention in a preferred embodiment, it should be apparent to those skilled in the art that the embodiment can be modified in arrangement and detail without departing from such principles. Accordingly, I claim as my invention all such embodiments as come within the scope and spirit of the following claims and equivalents thereto.

I claim:

1. In an interactive televideo system having a central control node in bidirectional communication with plural viewer stations that include video display sets operably coupled to interactive station controllers, the central control node delivering programming over multiple channels to the plural viewer stations and receiving information from the interactive station controllers, selected programming being delivered according to a programming schedule, a method of providing a selected viewer station with programming information for selected channels and a selected programming schedule period, comprising:

obtaining first and second programming images corresponding to programming available on respective first and second selected channels during the selected programming schedule period, the first programming image including a video segment relating to programming available on a first one of the selected channels and the second programming image including a single frame image relating to programming available on a second one of the selected channels, the first programming image being obtained by accessing a video segment relating to the programming available on the first one of the selected channels, the video segment being stored at the central control node; and rendering simultaneously the first and second programming images on the video display set of the selected viewer station.

2. The method of claim 1 in which obtaining the second programming image includes tuning to the second one of the selected channels and acquiring the single frame image relating to the programming available on the second one of the selected channels.

3. The method of claim 1 in which obtaining the second programming image includes accessing a stored video image relating to the programming available on the second one of the selected channels, the video image being stored at the central control node, and rendering the second programming image on the video display set includes rendering the stored video image.

4. The method of claim 1 further comprising:

obtaining plural other programming images corresponding to programming available on plural other selected channels during the selected programming schedule period; and rendering the plural other programming images simultaneously with the first and second programming images on the video display set of the selected viewer station.

5. The method of claim 4 in which the first, second, and plural other programming images are rendered on the video display set as an array of image tiles positioned adjacent each other.

6. The method of claim 1 further comprising obtaining a first viewer selection indication representing one of the selected channels as a focused channel and designating the focused channel as the first one of the selected channels.

7. The method of claim 6 further comprising obtaining a second viewer selection indication representing another one of the selected channels as a subsequent focused channel, the second viewer selection indication being obtained after the first viewer selection indication, and designating the subsequent focused channel as the first one of the selected channels.

8. In an interactive televideo system having a central control node in bidirectional communication with plural viewer stations that include video display sets operably coupled to interactive station controllers, the central control node delivering programming over multiple channels to the plural viewer stations and receiving information from the interactive station controllers, selected programming being delivered according to a programming schedule, a programming display on the video display set of at least a selected viewer station, comprising:

plural programming images rendered on the video display set of the selected viewer station and corresponding to programming available on the selected channels during a programming schedule period, a first programming image including a video segment relating to programming available on a first one of the selected channels, the video segment being stored at the central control node, and a second programming image including a single frame image relating to programming available on a second one of the selected channels.

9. The display of claim 8 in which the plural programming images are arranged as an array of image tiles positioned adjacent each other.

10. The display of claim 8 in which all the programming images other than the first programming image include a single frame image relating to programming available on the selected channels during the programming schedule period.

11. In an interactive televideo system having a central control node in bidirectional communication with plural viewer stations that include video display sets operably coupled to interactive station controllers, the central control node delivering programming over multiple channels to the plural viewer stations and receiving information from the interactive station controllers, selected programming being delivered according to a programming schedule, a method of providing a selected viewer station with programming information for selected channels and a selected future programming schedule period, comprising:

obtaining programming images corresponding to programming available on multiple selected channels during the selected future programming schedule period, at least selected ones of the programming images including video images of the programming available on the selected channels; and rendering the programming images on the video display set of the selected viewer station as a program guide array of programming images.

12. The method of claim 11 further comprising providing a viewer at the selected viewer station with a program guide array format selection interface by which the viewer selects a program guide array format and rendering the programming images on the video display set in accordance with the program guide array format.

13. The method of claim 11 in which obtaining at least one of the selected programming images includes accessing a stored video segment relating to the programming available on a first one of the selected channels and rendering the programming image on the video display set includes rendering the stored video segment.

14. The method of claim 13 in which the video segment is stored at the central control node.

15. The method of claim 11 in which obtaining the second programming image includes accessing a stored video image relating to the programming available on the second one of the selected channels and rendering the second programming image on the video display set includes rendering the stored video image.

16. The method of claim 11 further comprising obtaining a first viewer selection indication representing one of the selected channels as a focused channel and in which obtaining at least one of the selected programming images includes accessing a video segment relating to the programming available on the focused channel and rendering the programming image on the video display set includes rendering the video segment.

\* \* \* \* \*